United States Patent
Watanabe et al.

(10) Patent No.: US 9,843,040 B2
(45) Date of Patent: *Dec. 12, 2017

(54) NEGATIVE ELECTRODE ACTIVE MATERIAL FOR ELECTRIC DEVICE

(71) Applicant: NISSAN MOTOR CO., LTD., Kanagawa (JP)

(72) Inventors: Manabu Watanabe, Yokosuka (JP); Osamu Tanaka, Yokosuka (JP); Masao Yoshida, Zushi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/364,157

(22) PCT Filed: Oct. 29, 2012

(86) PCT No.: PCT/JP2012/077897
§ 371 (c)(1),
(2) Date: Jun. 10, 2014

(87) PCT Pub. No.: WO2013/088846
PCT Pub. Date: Jun. 20, 2013

(65) Prior Publication Data
US 2014/0319414 A1    Oct. 30, 2014

(30) Foreign Application Priority Data
Dec. 16, 2011  (JP) .................................. 2011-275668

(51) Int. Cl.
*H01M 4/38* (2006.01)
*C22C 13/00* (2006.01)
(Continued)

(52) U.S. Cl.
CPC ............. *H01M 4/387* (2013.01); *C22C 13/00* (2013.01); *C22C 18/00* (2013.01); *C22C 28/00* (2013.01);
(Continued)

(58) Field of Classification Search
CPC ...... C22C 18/00; C22C 13/00; H01M 10/052; H01M 4/386; H01M 4/387; H01M 4/42
(Continued)

(56) References Cited

U.S. PATENT DOCUMENTS 7,378,041 B2  5/2008  Asao et al.
7,425,285 B2  9/2008  Asao et al.
(Continued)

FOREIGN PATENT DOCUMENTS

EP  1313158 A2  5/2003
JP  2004311429 A  11/2004
(Continued)

OTHER PUBLICATIONS

Extended European Search Report dated Dec. 3, 2014, from the corresponding European Patent Application No. 12856913.4.

*Primary Examiner* — Peter F Godenschwager
*Assistant Examiner* — Andrew J Oyer
(74) *Attorney, Agent, or Firm* — Young Basile Hanlon & MacFarlane, P.C.

(57) ABSTRACT

A negative electrode active material for an electric device includes an alloy containing Si in a range from 23% to 64% exclusive, Sn in a range from 4% to 58% inclusive, Zn in a range from 0% to 65% exclusive, and inevitable impurities as a residue. The negative electrode active material can be obtained with a multi DC magnetron sputtering apparatus by use of, for example, silicon, tin and zinc as targets. An electric device such as a lithium ion secondary battery employing the negative electrode active material can improve cycle life of the battery and ensure a high capacity and high cycle durability.

8 Claims, 7 Drawing Sheets

Figure 1:
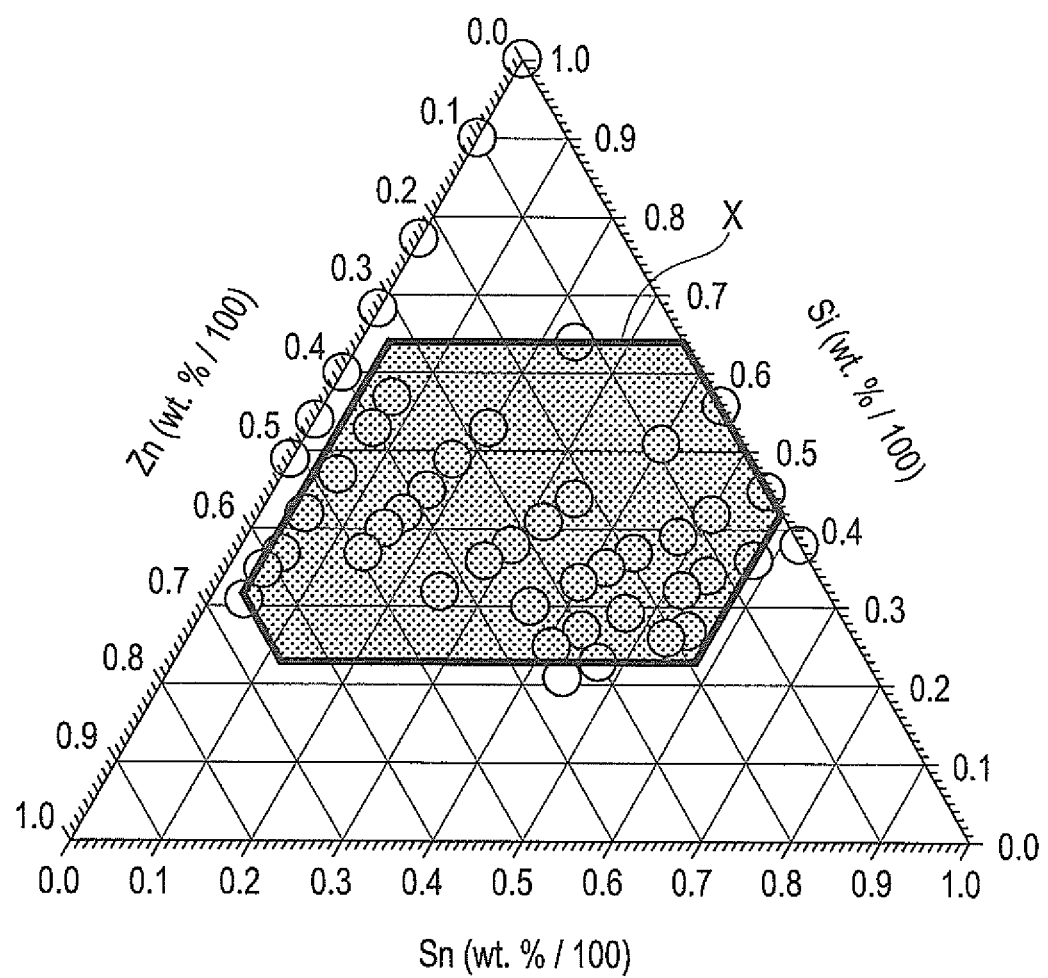

(51) Int. Cl.
*C22C 18/00* (2006.01)
*H01M 4/42* (2006.01)
*H01M 10/052* (2010.01)
*C22C 28/00* (2006.01)
*C22C 30/04* (2006.01)
*C22C 30/06* (2006.01)

(52) U.S. Cl.
CPC ............. *C22C 30/04* (2013.01); *C22C 30/06* (2013.01); *H01M 4/386* (2013.01); *H01M 4/42* (2013.01); *H01M 10/052* (2013.01); *Y02T 10/7011* (2013.01)

(58) Field of Classification Search
USPC ...................................... 252/182.1
See application file for complete search history.

(56) References Cited

U.S. PATENT DOCUMENTS

| | | |
|---|---|---|
| 9,070,935 B2 | 6/2015 | Murata et al. |
| 2006/0040182 A1 | 2/2006 | Kawakami et al. |
| 2009/0061322 A1 | 3/2009 | Kawakami et al. |
| 2010/0119942 A1 | 5/2010 | Kumar |
| 2010/0203396 A1 | 8/2010 | Murata |

FOREIGN PATENT DOCUMENTS

| | | |
|---|---|---|
| JP | 2005-044672 A | 2/2005 |
| JP | 2005078999 A | 3/2005 |
| JP | 2006-120324 A | 5/2006 |

NEGATIVE ELECTRODE ACTIVE MATERIAL FOR ELECTRIC DEVICE

CROSS REFERENCE TO RELATED APPLICATION

The present application claims priority to Japanese Patent Application No. 2011-275668, filed Dec. 16, 2011, incorporated herein in its entirety.

TECHNICAL FIELD

The present invention relates to a negative electrode active material for an electric device, as represented by a secondary battery or a capacitor, suitably used as a driving power source of a motor for use in a vehicle such as an electric vehicle (EV) and a hybrid electric vehicle (HEV).

BACKGROUND

Various measures for reduction of emissions of $CO_2$ are being adopted in order to deal with atmospheric pollution and global warming. In the automobile industry, the reduction of emissions of $CO_2$ is highly expected in association with the spread of electric vehicles and hybrid electric vehicles. Thus, development of high-performance secondary batteries used as driving power sources of motors for these vehicles is actively being carried out.

In particular, a higher capacity and cycle property are required for the secondary batteries used as driving power sources of motors for those vehicles. In view of this, lithium ion secondary batteries having high theoretical energy are gaining increasing attention among other types of secondary batteries.

The lithium ion secondary batteries are required to store a large amount of electricity in positive electrodes and negative electrodes per unit mass, in order to increase energy density of the lithium ion secondary batteries. Thus, it is quite important for the lithium ion secondary batteries to determine appropriate active materials used in the respective electrodes so as to fulfill such a requirement.

For example, Japanese Unexamined Patent Application Publication No. 2004-311429 has proposed an electrode material and an electrode structure capable of improving performance of a lithium ion secondary battery with low resistivity, high efficiency of charge and discharge, and high capacity. Patent Literature 1 has further proposed a secondary battery using the electrode material and the electrode structure.

In particular, Japanese Unexamined Patent Application Publication No. 2004-311429 discloses an electrode material including solid-state alloy particles mainly containing silicon, in which a microcrystalline or amorphous substance containing an element other than silicon is dispersed in microcrystalline silicon or amorphous silicon.

SUMMARY

However, the lithium ion secondary battery using the electrode material described in Japanese Unexamined Patent Application Publication No. 2004-311429 has a problem of decreasing cycle life of the electrode because of a shift from an amorphous state to a crystalline state caused when silicon (Si) is alloyed with lithium (Li) and thereby resulting in a great change in volume.

In addition, in the case that the Si series active material is used, a capacity generally has a trade-off relationship with cycle durability. Thus, there has been a demand for development of active materials capable of concurrently ensuring a high capacity and improving cycle durability.

The present invention has been made in view of the conventional problem. An object of the present invention is to provide a negative electrode active material for an electric device such as a lithium ion secondary battery capable of suppressing amorphous-crystal phase transition so as to extend cycle life, and further provide a negative electrode active material capable of ensuring higher capacity. Another object of the present invention is to provide a negative electrode for an electric device, an electric device and a lithium ion secondary battery using such a negative electrode active material.

A negative electrode active material for an electric device according to an aspect of the present invention includes an alloy containing, in terms of mass ratio, silicon (Si) in a range from 23% to 64% exclusive, tin (Sn) in a range from 4% to 58% inclusive, zinc (Zn) in a range from 0% to 65% exclusive, and inevitable impurities as a residue.

BRIEF DESCRIPTION OF DRAWINGS

FIG. 1 is a ternary composition diagram showing composition ranges of a Si—Sn—Zn series alloy contained in a negative electrode active material for an electric device according to the present invention, wherein the alloy composition obtained for each example is plotted.

FIG. 2 is a ternary composition diagram showing preferred composition ranges of the Si—Sn—Zn series alloy contained in the negative electrode active material for an electric device according to the present invention.

FIG. 3 is a ternary composition diagram showing further preferred composition ranges of the Si—Sn—Zn series alloy contained in the negative electrode active material for an electric device according to the present invention.

FIG. 4 is a ternary composition diagram showing still further preferred composition ranges of the Si—Sn—Zn series alloy contained in the negative electrode active material for an electric device according to the present invention.

FIG. 5 is a diagram showing an influence of the alloy composition of the negative electrode active material on an initial discharge capacity in a battery prepared in each of Examples and Comparative Examples according to the present invention.

FIG. 6 is a diagram showing a relationship between a discharge capacity retention at the 50th cycle and the alloy composition of the negative electrode active material in the battery prepared in each of Examples and Comparative Examples according to the present invention.

FIG. 7 is a diagram showing a relationship between a discharge capacity retention at the 100th cycle and the alloy composition of the negative electrode active material in the battery prepared in each of Examples and Comparative Examples according to the present invention.

FIG. 8 is a schematic view showing an example of a lithium ion secondary battery according to an embodiment of the present invention.

DESCRIPTION OF EMBODIMENTS

Hereinafter, a negative electrode active material for an electric device according to an embodiment of the present invention will be explained in detail while exemplifying a negative electrode for a lithium ion secondary battery using the negative electrode active material and a lithium ion secondary battery. Here, in the present description, the symbol "%" represents a percentage by mass unless otherwise specified. It should be noted that dimensional ratios in the drawings are magnified for convenience of explanation and may be different from actual ratios.

[Negative Electrode Active Material for Electric Device]

A negative electrode active material according to the present invention includes an alloy containing silicon (Si) in the range from 23% to 64% exclusive, tin (Sn) in the range from 4% to 58% inclusive, zinc (Zn) in the range from 0% to 65% exclusive, and inevitable impurities as a residue. These numerical ranges are included in the area indicated by reference sign X shown in FIG. 1. This negative electrode active material is used in a negative electrode for an electric device such as a lithium ion secondary battery. In such a case, the alloy contained in the negative electrode active material absorbs lithium ions when the battery is charged and releases the lithium ions when the battery is discharged.

In particular, the negative electrode active material for an electric device is a silicon series active material to which Sn as a first additive element and Zn as a second additive element are added. The second additive element of Zn appropriately selected can suppress amorphous-crystal phase transition so as to extend cycle life when being alloyed with lithium. Such an active material contributes to ensuring a higher capacity compared with carbon series negative electrode active materials.

The composition ranges of Sn and Zn as the first and second additive elements are optimally determined so as to obtain the negative electrode active material containing the Si (Si—Sn—Zn series) alloy capable of exhibiting better cycle life after 50 cycles and even after 100 cycles.

In the negative electrode active material containing the Si—Sn—Zn series alloy, if the content of silicon is less than 23%, a sufficient discharge capacity at the first cycle may not be obtained. If the content of tin is less than 4%, a high discharge capacity retention at the 50th cycle cannot be obtained. Further, if the contents of the respective elements do not fall within the respective ranges described above, the cycle durability decreases and the discharge capacity retention at the 100th cycle does not exceed 50%.

Figure 2:
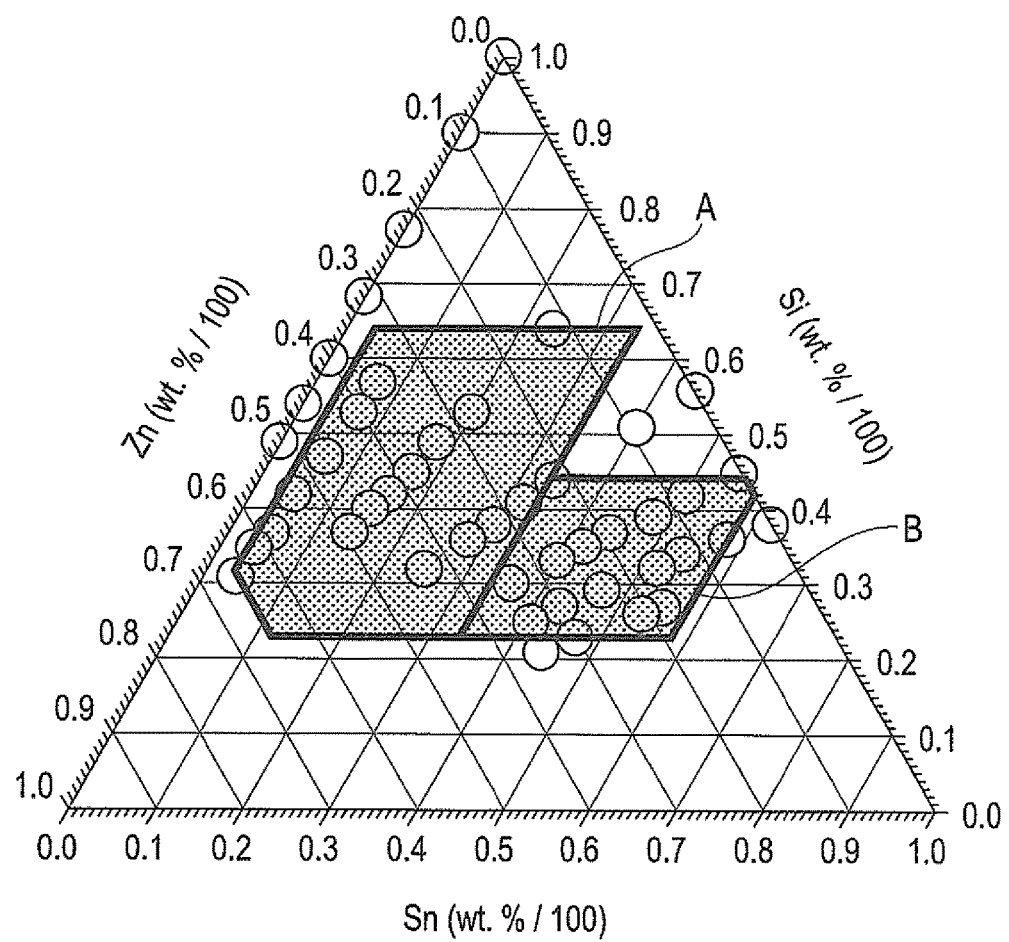
Figure 3:
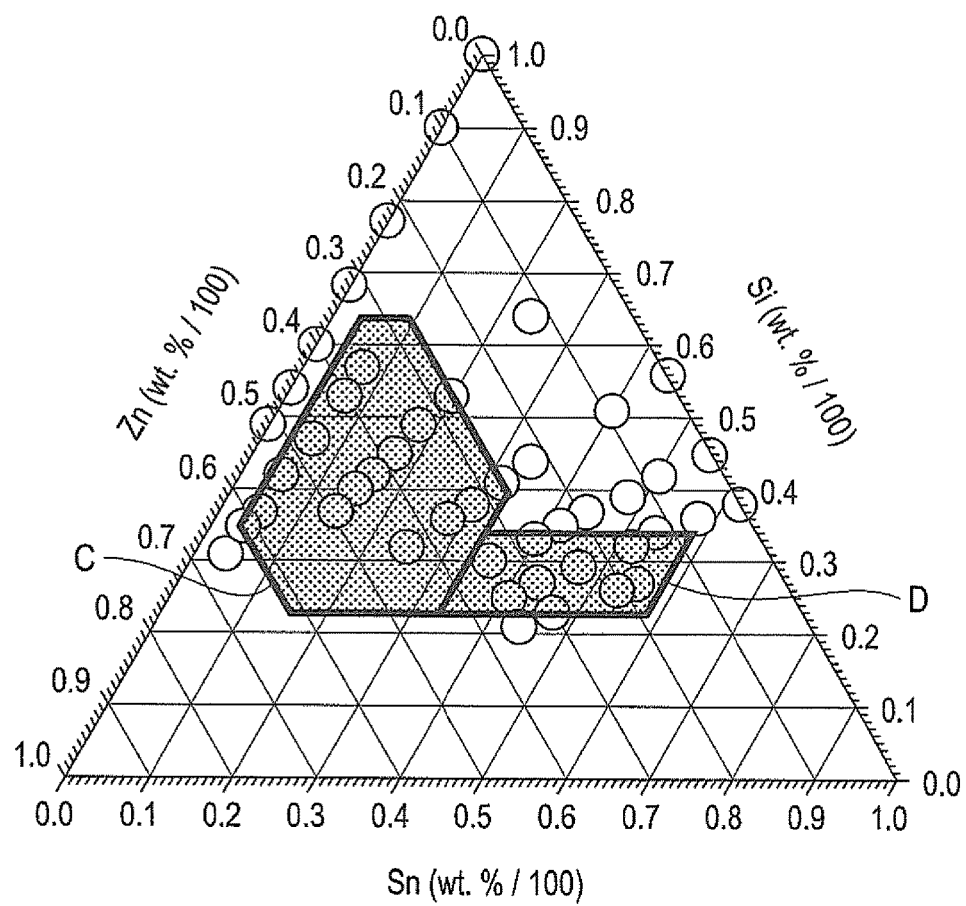

In order to further improve the properties of the negative electrode active material, the contents of the respective elements preferably fall within the ranges included in the area indicated by reference sign A shown in FIG. 2 to fulfill 23%<Si<64%, 4%≤Sn<34% and 2%<Zn<65%. The contents of the respective elements further preferably fall within the ranges included in the area indicated by reference sign B shown in FIG. 2 to fulfill 23%<Si<44%, 34%≤Sn≤58% and 0%<Zn<43%. The alloy containing the respective elements within these ranges can ensure a discharge capacity retention of 92% or higher at the 50th cycle and a discharge capacity retention exceeding 55% at the 100th cycle. In order to achieve a higher cycle property, the contents of the respective elements preferably fall within the ranges included in the area indicated by reference sign C shown in FIG. 3 to fulfill 23%<Si<64%, 4%≤Sn<34% and 27%<Zn<61%. The contents of the respective elements further preferably fall within the ranges included in the area indicated by reference sign D shown in FIG. 3 to fulfill 23%<Si<34%, 34%≤Sn≤58% and 8%<Zn<43%. The alloy containing the respective elements within these ranges can increase the cycle property and durability and ensure a discharge capacity retention exceeding 65% at the 100th cycle.

Figure 4:
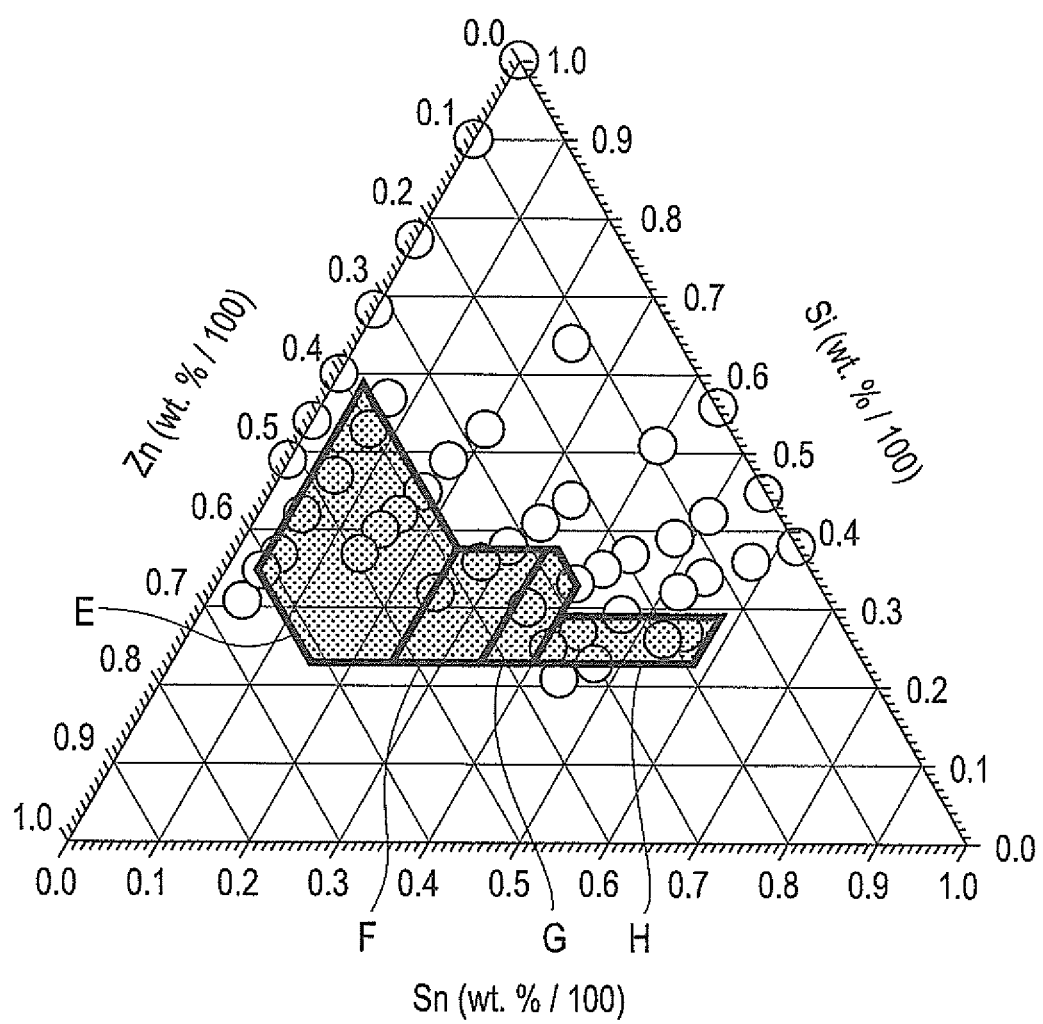

The contents of the respective elements still further preferably fall within the ranges included in the area indicated by reference sign E shown in FIG. 4 to fulfill 23%<Si<58%, 4%≤Sn<24% and 38%<Zn<61%, fall within the ranges included in the area indicated by reference sign F shown in FIG. 4 to fulfill 23%<Si<38%, 24%≤Sn<34% and 27%<Zn<53%, fall within the ranges included in the area indicated by reference sign G shown in FIG. 4 to fulfill 23%<Si<38%, 34%≤Sn<40% and 27%<Zn<44%, or fall within the ranges included in the area indicated by reference sign H shown in FIG. 4 to fulfill 23%<Si<29%, 40%≤Sn<58% and 13%<Zn<37%. The alloy containing the respective elements within these ranges can improve the cycle durability and ensure a discharge capacity retention exceeding 75% at the 100th cycle.

Here, the alloy included in the negative electrode active material according to the present invention inevitably contains impurities derived from the raw materials and the production method, in addition to the three elements described above. The content of the inevitable impurities is preferably less than 0.5% by mass, more preferably less than 0.1% by mass.

As described above, the alloy included in the negative electrode active material according to the present embodiment contains silicon in the range from 23% by mass to 64% by mass exclusive, tin in the range from 4% by mass to 58% by mass inclusive, zinc in the range from 0% by mass to 65% by mass exclusive and inevitable impurities as a residue. Namely, the alloy consists of silicon in the range from 23% by mass to 64% by mass exclusive, tin in the range from 4% by mass to 58% by mass inclusive, zinc in the range from 0% by mass to 65% by mass exclusive and inevitable impurities.

The method for manufacturing the negative electrode active material according to the present invention, which is the Si—Sn—Zn series alloy having the above-described composition ranges, is not particularly limited, and conventionally known various methods may be used. Namely, any conventional manufacturing methods may be used without any particular obstacle, since there is little difference in the conditions and characteristics of the alloy depending on the manufacturing methods. For example, the thin film alloy having the above-described composition ranges may be obtained by a multi PVD method (such as a sputtering method, a resistance heating method or a laser ablation method), or by a multi CVD method (such as a chemical vapor-phase growth method).

The alloyed thin film has the advantage of simplification of the manufacturing process since the negative electrode can be obtained in such a manner as to apply the alloyed thin film directly on a current collector. In addition, the alloyed thin film need not use other components, such as a binder and an electric conducting additive, composing a negative electrode active material layer other than the alloy. Therefore, the alloyed thin film as the negative electrode active material can simply be used for the negative electrode. Accordingly, the alloyed thin film contributes to ensuring a high capacity and high energy density, which satisfy the level suitable for practical use in vehicles. Furthermore, the alloyed thin film is suitable for analysis of the electrochemical characteristics of the active material.

The alloyed thin film may be manufactured by use of a multi DC magnetron sputtering apparatus. For example, an independently controllable ternary DC magnetron sputtering apparatus may freely form Si—Sn—Zn series alloyed thin films having various alloy constitutions and thicknesses on the surface of the substrate (the current collector). In particular, the apparatus uses target 1 (Si), target 2 (Sn) and target 3 (Zn), fixes the sputtering time, and changes the power level of the DC power source to 185 W for Si, in the range from 0 W to 45 W for Sn, and in the range from 0 W to 180 W for Zn. Accordingly, ternary series alloy samples having various composition formulae can be obtained. It should be noted that, since sputtering conditions depend on sputtering devices, it is preferable to estimate appropriate ranges of the sputtering conditions through preliminary tests for each sputtering device.

As described above, the negative electrode active material layer according to the present embodiment can use the Si—Sn—Zn series alloyed thin film. Alternatively, the negative electrode active material layer may be a layer containing particles of the Si—Sn—Zn series alloy as a main component. Note that, in the present description, "a main component" represents a component contained in the negative electrode active material layer with content of greater than or equal to 50% by mol. Examples of the method for manufacturing such an alloy in a particle state include a mechanical alloying method and a roll rapid cooling method after arc plasma melting.

When the alloy in the particle state is used as the negative electrode active material, slurry is prepared first in a manner such that a binder, an electric conducting additive and a viscosity control solvent are added to the alloy particles. The slurry thus obtained is then applied to the current collector to form the negative electrode active material layer so as to obtain the negative electrode. Such a process is superior in terms of mass production and practicality for actual battery electrodes.

When the alloy in the particle state is used as the negative electrode active material, the average particle diameter of the particles is not particularly limited as long as it is substantially the same as that employed in conventional negative electrode active materials. Here, in view of higher output power, the average particle diameter is preferably in the range from 1 μm to 20 μm; however, the average particle diameter does not necessarily fall within this range as long as it can effectively achieve the effects described above.

Note that, in the description of the present invention, "the particle diameter" represents the greatest length between any two points on the circumference of the active material particle (the observed plane) observed by observation means such as a scanning electron microscope (SEM) or a transmission electron microscope (TEM). In addition, "the average particle diameter" represents a value calculated with the scanning electron microscope (SEM) or the transmission electron microscope (TEM) as an average value of particle diameters of the particles observed in several to several tens of fields of view. Particle diameters and average particle diameters of other constituents may be determined in the same manner.

Hereinafter, the constitution of the lithium ion secondary battery and the materials used therein will be explained.

[Negative Electrode for Electric Device and Electric Device]

Figure 8:
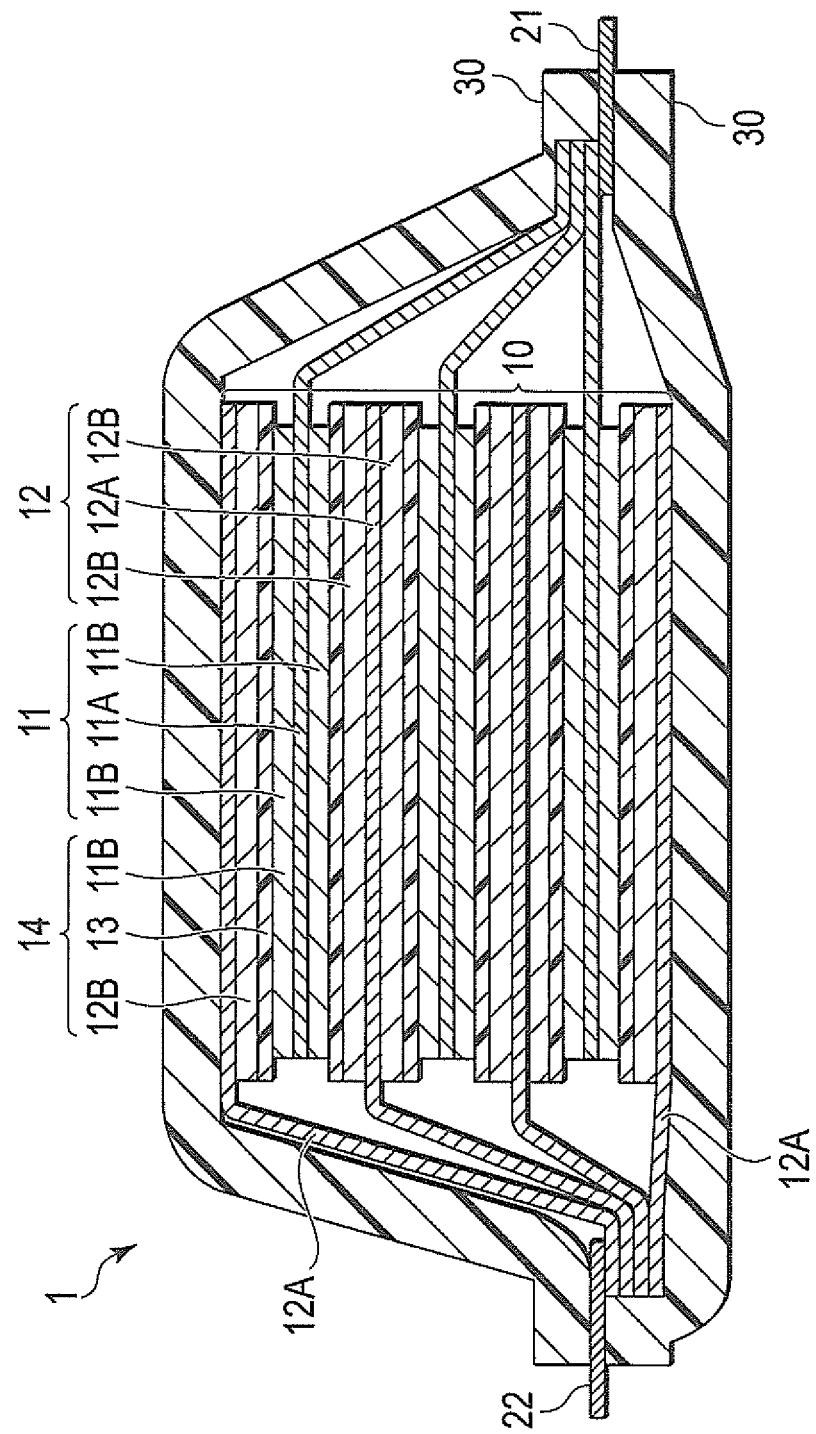

A negative electrode for an electric device according to an embodiment of the present invention includes the negative electrode active material containing the Si—Sn—Zn series alloy described above. Representative examples of the electric device include a lithium ion secondary battery and an electrical double layer capacitor. The lithium ion secondary battery generally has a configuration, as shown in FIG. 8, in which positive electrodes 11 and negative electrodes 12 are connected via electrolyte layers 13, each positive electrode 11 having a configuration in which a positive electrode active material and the like is applied to a positive electrode current collector, each negative electrode 12 having a configuration in which a negative electrode active material and the like is applied to a negative electrode current collector. The positive electrodes 11, the electrolyte layers 13 and the negative electrodes 12 are housed in an exterior body. The respective components of the lithium ion secondary battery and the materials used therein are explained in detail below.

(Positive Electrode)

In the lithium ion secondary battery 1 according to the present embodiment, the positive electrode 11 has a configuration in which a positive electrode active material layer 11B is formed on one surface or both surfaces of a positive electrode current collector 11A. The positive electrode current collector 11A preferably contains an electrically conductive material such as aluminum foil, copper foil, nickel foil or stainless foil.

The thickness of the positive electrode current collector 11A is not particularly limited but is generally preferably in the range from 1 μm to 30 μm. The content ratio of the positive electrode active material, an electric conducting additive and a binder in the positive electrode active material layer 11B is not particularly limited.

Examples of the positive electrode active material include a lithium-transition metal composite oxide, a lithium-transition metal phosphate compound, a lithium-transition metal sulfated compound, a solid solution series material, a ternary series material, a NiMn series material, a NiCo series material, and a spinel Mn series material.

Examples of the lithium-transition metal composite oxide include $LiMn_2O_4$, $LiCoO_2$, $LiNiO_2$, $Li(Ni, Mn, Ce)O_2$, $Li(Li, Ni, Mn, Ce)O_2$, $LiFePO_4$, and an oxide in which part of the transition metal contained in each of these composite oxides is replaced with other elements.

Examples of the solid solution series material include $xLiMO_2 \cdot (1-x)Li_2NO_3$ (where $0<x<1$, M represents at least one transition metal element in an average oxidation state of 3+, and N represents at least one transition metal element in an average oxidation state of 4+), and $LiRO_2$—$LiMn_2O_4$ (where R represents a transition metal element such as Ni, Mn, Co and Fe).

The ternary series material may be a nickel-cobalt-manganese (composite) positive electrode material. The spinel Mn series material may be $LiMn_2O_4$. The NiMn series material may be $LiNi_{0.5}Mn_{1.5}O_4$. The NiCo series material may be $Li(NiCo)O_2$. Two or more kinds of the positive electrode active materials may be combined together according to circumstances. In view of capacity and output performance, the lithium-transition metal composite oxide is preferably used for the positive electrode active material.

The particle diameter of the positive electrode active material is not particularly limited; however, it is generally preferably as small as possible. In view of operation efficiency and ease of handling, the average particle diameter of the positive electrode active material may be approximately in the range from 1 μm to 30 μm, preferably approximately in the range from 5 μm to 20 μm. Other positive electrode active materials having different particle diameters may be used. In the case that the active materials require different particle diameters in order to achieve their own appropriate effects, the active materials having different particle diameters may be selected and mixed together so as to optimally function to achieve their own effects. Thus, it is not necessary to equalize the particle diameter of all of the active materials.

The binder in the positive electrode active material layer 11B is added to bind the active materials to each other or bind the active material to the current collector to maintain the electrode structure. The binder may be thermoplastic resin such as polyvinylidene fluoride (PVDF), polytetrafluoroethylene (PTFE), polyvinyl acetate, polyimide (PI), polyamide (PA), polyvinyl chloride (PVC), polymethyl acrylate (PMA), polymethyl methacrylate (PMMA), polyether nitrile (PEN), polyethylene (PE), polypropylene (PP), and polyacrylonitrile (PAN), thermosetting resin such as epoxy resin, polyurethane resin, and urea resin, or a rubber material such as styrene-butadiene rubber (SBR).

The electric conducting additive in the positive electrode active material layer 11B is also referred to as an electric conducting agent added to improve electric conductivity. The electric conducting additive used in the present invention is not particularly limited, and a conventionally known agent may be used. The electric conducting additive may be a carbon material such as carbon black (such as acetylene black), graphite, and carbon fiber. The addition of the electric conducting additive contributes to effectively establishing an electronic network in the active material layer so as to improve output performance and battery reliability in association with an improvement in retention of an electrolysis solution.

(Negative Electrode)

The negative electrode 12 has a configuration, as in the case of the positive electrode 11, in which a negative electrode active material layer 12B is formed on one surface or both surfaces of a negative electrode current collector 12A. The negative electrode current collector 12A preferably contains, as in the case of the positive electrode current collector 11A, an electrically conductive material such as aluminum foil, copper foil, nickel foil or stainless foil. The thickness of the negative electrode current collector 12A is preferably approximately in the range from 1 µm to 30 µm, as in the case of the positive electrode current collector 11A.

As described above, the negative electrode active material according to the present embodiment contains the Si—Sn—Zn series alloy having the above-described composition as an essential component. The negative electrode active material layer 12B according to the present embodiment may be a thin film including the Si—Sn—Zn series alloy. In that case, the negative electrode active material layer may consist of the Si—Sn—Zn series alloy or may further contain a different negative electrode active material described below.

Alternatively, as described above, the negative electrode active material layer 12B may be a layer containing the particles of the Si—Sn—Zn series alloy as a main component. In that case, the negative electrode active material layer 12B may contain the electric conducting additive and the binder as necessary, which the positive electrode active material layer 11B may also contain.

The lithium ion secondary battery which is the electric device according to the present embodiment includes the negative electrode active material containing the Si—Sn—Zn series alloy having the above-described composition. Note that a conventionally known negative electrode active material capable of reversibly absorbing and releasing lithium may be used together without any particular obstacle as long as the negative electrode active material containing the above-described alloy is included as an essential component.

The other negative electrode active material used together may be a carbon material such as graphite which is highly crystalline carbon (such as natural graphite and artificial graphite), low crystalline carbon (such as soft carbon and hard carbon), carbon black (such as Ketjenblack, acetylene black, channel black, lamp black, oil furnace black, and thermal black), fullerene, carbon nanotube, carbon nanofiber, carbon nanohorn, and carbon fibril, a single substance alloyed with lithium such as Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl, an oxide and a carbide containing the elements listed above (oxide: silicon monoxide (SiO), $SiO_x$ (0<x<2), tin dioxide ($SnO_2$), $SnO_x$ (0<x<2), or $SnSiO_3$; carbide: silicon carbide (SiC)), a metallic material such as lithium metal, and a lithium-transition metal composite oxide such as a lithium-titanium composite oxide (lithium titanate: $Li_4Ti_5O_{12}$).

The negative electrode 12 may be obtained in a manner such that slurry containing the negative electrode active material together with the electric conducting additive and the binder, is applied to the surface of the negative electrode current collector 12A to form the negative electrode active material layer 12B. Alternatively, the negative electrode 12 may be obtained in a manner such that a thin film of the negative electrode active material alloy is directly formed on the surface of the negative electrode current collector 12A by a multi PVD method or a multi CVD method.

As described above, the positive electrode active material layer and the negative electrode active material layer are each provided on one surface or both surfaces of the respective current collectors. Alternatively, one current collector may be provided with the positive electrode active material layer on one surface and provided with the negative electrode active material layer on the other surface. Electrodes having such a configuration are used for a bipolar battery.

(Electrolyte Layer)

The electrolyte layer 13 contains a non-aqueous electrolyte to serve as a carrier of lithium ions that move between the positive electrode and the negative electrode during charge and discharge. The thickness of the electrolyte layer 13 is preferably reduced as much as possible so as to decrease internal resistance. The thickness is generally approximately in the range from 1 µm to 100 µm, preferably in the range from 5 µm to 50 µm.

The non-aqueous electrolyte contained in the electrolyte layer 13 is not particularly limited as long as it functions as a carrier of lithium ions, but may be a liquid electrolyte or a polymer electrolyte.

The liquid electrolyte has a constitution in which lithium salt (electrolyte salt) is dissolved in an organic solvent. The organic solvent may be carbonate such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and methyl propyl carbonate (MPC). The lithium salt may be a compound that can be added to the electrode active material layers of the electrodes, such as $Li(CF_3SO_2)_2N$, $Li(C_2F_5SO_2)_2N$, $LiPF_6$, $LiBF_4$, $LiAsF_6$, $LiTaF_6$, $LiClO_4$, and $LiCF_3SO_3$.

The polymer electrolyte is divided into two types; a gel polymer electrolyte (a gel electrolyte) containing an electrolysis solution, and an intrinsic polymer electrolyte not containing an electrolysis solution.

The gel polymer electrolyte preferably has a constitution in which the liquid electrolyte is poured into a matrix polymer (a host polymer) including an ion conductive polymer. The use of the gel polymer electrolyte has the advantage of decreasing fluidity of the electrolyte so as to easily interrupt ion conduction between the respective layers. The ion conductive polymer used for the matrix polymer (the host polymer) is not particularly limited. Examples thereof include polyethylene oxide (PEO), polypropylene oxide (PPO), polyvinylidene fluoride (PVDF), a copolymer of polyvinylidene fluoride and hexafluoropropylene (PVDF-HFP), polyethylene glycol (PEG), polyacrylonitrile (PAN), polymethyl methacrylate (PMMA), and a copolymer of these compounds.

The ion conductive polymer may be the same as, or different from, an ion conductive polymer used as the electrolyte in the active material layers, but is preferably the same. The type of the electrolysis solution, namely, the lithium salt and the organic solvent, is not particularly limited and may employ the electrolyte salt such as the lithium salt described above and the organic solvent such as the carbonate described above.

The intrinsic polymer electrolyte has a constitution in which lithium salt is dissolved in the matrix polymer, but no organic solvent is contained. Thus, the use of the intrinsic polymer electrolyte contributes to reducing the risk of liquid leakage from the battery and thereby increasing reliability of the battery.

The matrix polymer of the gel polymer electrolyte or the intrinsic polymer electrolyte can exhibit high mechanical strength when a cross-linked structure is formed. The cross-linked structure may be formed in a manner such that a polymerizable polymer used for polymer electrolyte formation (for example, PEO and PPO) is subjected to polymerization by use of an appropriate polymerization initiator. Examples of the polymerization include thermal polymerization, ultraviolet polymerization, radiation polymerization, and electron beam polymerization. The non-aqueous electrolyte contained in the electrolyte layer 13 may be used singly, or two or more kinds thereof may be mixed together.

A separator is preferably used in the electrolyte layer 13 when the electrolyte layer 13 contains the liquid electrolyte or the gel polymer electrolyte. The specific configuration of the separator may be a microporous film containing polyolefin such as polyethylene and polypropylene.

(Positive Electrode Tab and Negative Electrode Tab)

As shown in FIG. 8, the lithium ion secondary battery 1 according to the present embodiment has a configuration in which a battery constituent 10 to which a positive electrode tab 21 and a negative electrode tab 22 are attached, is sealed in an exterior body 30. In the present embodiment, the positive electrode tab 21 and the negative electrode tab 22 are exposed to the outside of the exterior body 30 on opposite sides. Although not shown in the figure, the positive electrode tab and the negative electrode tab may be exposed to the outside of the exterior body on the same side. In addition, the positive electrode tab and the negative electrode tab may be attached to the positive electrode current collectors 11A and the negative electrode current collectors 12A by, for example, ultrasonic welding or resistance welding.

The positive electrode tab 21 and the negative electrode tab 22 are made of a material such as aluminum, copper, titanium, nickel, stainless steel (SUS), or an alloy thereof. However, the material is not limited thereto and may be any conventionally known material used for tabs for lithium ion secondary batteries.

The positive electrode tab 21 and the negative electrode tab 22 may be made of the same material, or may be made of different materials. The tabs may be prepared preliminarily and then connected to the positive electrode current collectors 11A and the negative electrode current collectors 12A, which is the configuration according to the present embodiment. Alternatively, each of the positive electrode current collectors 11A and the negative electrode current collectors 12A may be elongated to serve as the respective tabs. Although not shown in the figure, each part of the positive electrode tab 21 and the negative electrode tab 22 exposed to the outside of the exterior body 30 is preferably covered with, for example, a heat shrinkable tube having a heat resistant and insulating property. This configuration decreases the chances of any negative influence on surrounding products, such as components in a vehicle, in particular, electronic devices, caused by a short circuit because of contact of the positive electrode tab 21 and the negative electrode tab 22 with peripheral devices or wires.

In addition, current collecting plates may be used to extract and lead current to the outside of the battery. Such current collecting plates are electrically connected to the current collectors and leads and are exposed to the outside of the exterior body 30. The material constituting the current collecting plates is not particularly limited and may be a highly electrically conductive material conventionally used for current collecting plates for lithium ion secondary batteries. For example, the constituent material of the current collecting plates is preferably a metallic material such as aluminum, copper, titanium, nickel, stainless steel (SUS), or an alloy thereof, particularly preferably aluminum or copper in view of lightness, corrosion resistance and high electric conductivity. The positive electrode current collecting plates and the negative electrode current collecting plates may be made of the same material, or may be made of different materials.

(Exterior Body)

The exterior body 30 is preferably made of a film-like exterior material in view of, for example, a reduction in size and weight. However, the exterior body 30 is not limited thereto and may be a conventionally known material used for exterior bodies for lithium ion secondary batteries. Namely, a metal can casing may be used.

Here, a polymer-metal composite laminate sheet having high thermal conductivity may be used since this sheet has higher output power and cooling performance and therefore is suitably used in a battery for a large device such as an electric vehicle or a hybrid electric vehicle. In particular, an exterior body made of an exterior material such as a laminate film having a three-layer structure in which PP, aluminum and nylon are laminated in this order, may be used.

As described above, the lithium ion secondary battery according to the present embodiment includes the battery constituent 10 in which a plurality of battery elements (electrode structures) 14 each including the positive electrode and the negative electrode connected to each other via the electrolyte layer, are stacked on top of each other. The lithium ion secondary battery has a structure in which the battery constituent 10 is housed in a battery case such as a can body or a lamination container (a package body).

The battery is divided into two types: a wound type battery having a structure in which positive electrodes 11, electrolyte layers 13 and negative electrodes 12 are wound, and a laminated type battery having a structure in which positive electrodes 11, electrolyte layers 13 and negative electrodes 12 are stacked. The battery shown in FIG. 8 and a bipolar battery have a structure corresponding to the laminated type battery. The battery is also referred to as a coin cell, a button battery or a laminated battery depending on the shape and structure of the battery case.

EXAMPLES

Hereinafter, the present invention is explained in more detail with reference to examples; however, the present invention is not limited to these examples.

[1] Preparation of Negative Electrode

As a sputtering apparatus, an independently controllable ternary DC magnetron sputtering apparatus (manufactured by Yamato-Kiki Industrial Co., Ltd.; combinatorial sputter coating apparatus; gun-sample distance: about 100 mm) was used. Thin films of negative electrode active material alloys having various constitutions were each formed with this apparatus on a substrate (a current collector) made of nickel foil having a thickness of 20 μm using the following targets under the following film formation conditions, so as to obtain 32 negative electrode samples.

(1) Targets (Manufactured by Kojundo Chemical Laboratory Co., Ltd.; Purity: 4N)
Si: diameter of 50.8 mm; thickness of 3 mm (with backing plate of oxygen-free copper with thickness of 2 mm)
Sn: diameter of 50.8 mm; thickness of 5 mm
Zn: diameter of 50.8 mm; thickness of 3 mm
(2) Film Formation Conditions
Base pressure: up to $7\times10^{-6}$
Sputtering gas: Ar (99.9999% or higher)
Sputtering gas introduction amount: 10 sccm
Sputtering pressure: 30 mTorr
DC power source: Si (185 W), Sn (0 to 40 W), Zn (0 to 150 W)
Pre-sputtering time: 1 min.
Sputtering time: 10 min.
Substrate temperature: room temperature Namely, in each example, the Si target, the Sn target and the Zn target were used, the sputtering time was set to 10 minutes, and the power level of the DC power source was changed in each target so as to be set to the respective ranges described above. Then, the alloyed thin films in an amorphous state were each formed on the Ni substrate so as to obtain the negative electrode samples including the alloyed thin films having various constitutions.

As for the sample preparation, for example, in Example 4, the DC power source 1 (the Si target) was set to 185 W, the DC power source 2 (the Sn target) was set to 22 W, and the DC power source 3 (the Zn target) was set to 100 W. In Comparative Example 2, the DC power source 1 (the Si target) was set to 185 W, the DC power source 2 (the Sn target) was set to 30 W, and the DC power source 3 (the Zn target) was set to 0 W. In Comparative Example 5, the DC power source 1 (the Si target) was set to 185 W, the DC power source 2 (the Sn target) was set to 0 W, and the DC power source 3 (the Zn target) was set to 25 W.

Tables 1 and 2 and FIG. 1 show the constituent composition of the respective alloyed thin films. The obtained alloyed thin films were analyzed by use of the following analyzing method and analyzing device.

(3) Analyzing Method
Composition analysis: SEM-EDX analysis (manufactured by JEOL Ltd.), EPMA analysis (manufactured by JEOL Ltd.)
Film thickness measurement (for calculating sputtering rate): film thickness meter (manufactured by Tokyo Instruments, Inc.)
Film state analysis: Raman spectroscopic analysis (manufactured by Bruker Corporation)

[2] Preparation of Batteries

Each negative electrode sample obtained as described above was placed to face the counter electrode (the positive electrode) made of lithium foil with a separator interposed therebetween, and an electrolysis solution was poured therein, so as to prepare a CR2032 type coin cell for each example. The lithium foil used was lithium foil (manufactured by Honjo Metal Co., Ltd.) cut out in such a manner as to have a diameter of 15 mm and a thickness of 200 μm. The separator used was Celgard 2400 (manufactured by Celgard, LLC.). The electrolysis solution was prepared in a manner such that $LiPF_6$ was dissolved, at a concentration of 1 M, into a mixed non-aqueous solvent in which ethylene carbonate (EC) and diethyl carbonate (DEC) were mixed in the volume ratio of 1:1.

[3] Charge-Discharge Test of Batteries

The batteries obtained as described above were each subjected to the following charge-discharge test. That is, a charge-discharge tester was used, and the respective batteries were charged and discharged in a thermostat bath set at 300 K (27° C.). The charge-discharge tester used was HJ0501SM8A (manufactured by Hokuto Denko Corporation), and the thermostat bath used was PFU-3K (manufactured by ESPEC Corp.).

Each battery was charged at 0.1 mA from 2 V to 10 mV in constant current/constant voltage mode during charge, that is, in the process of Li intercalation to the negative electrode to be subjected to evaluation. After that, each battery was discharged at 0.1 mA from 10 mV to 2 V in constant current mode during discharge (in the process of Li release from the negative electrode). This charge-discharge procedure was regarded as a single cycle and repeated 100 times.

The discharge capacities at the 50th cycle and the 100th cycle were obtained so as to calculate the discharge capacity retention at the 50th cycle and the 100th cycle with respect to the discharge capacity at the 1st cycle. Tables 1 and 2 and FIG. 5 to FIG. 7 each show the results thus obtained. With regard to the respective retention shown in Tables 1 and 2, for example, the discharge capacity retention at the 50th cycle was calculated according to ((discharge capacity at 50th cycle)/(discharge capacity at 1st cycle))×100. Here, the respective discharge capacities are indicated by values calculated per alloy weight.

TABLE 1

| Example | Negative Electrode Active Material Components (%) | | | Discharge Capacity at 1st Cycle (mAh/g) | Discharge Capacity Retention (%) | |
|---|---|---|---|---|---|---|
| | Si | Sn | Zn | | at 50th Cycle | at 100th Cycle |
| 1 | 57 | 7 | 36 | 2457 | 94 | 69 |
| 2 | 53 | 7 | 40 | 2357 | 100 | 89 |
| 3 | 47 | 6 | 47 | 2200 | 100 | 98 |
| 4 | 42 | 5 | 53 | 2121 | 100 | 100 |
| 5 | 37 | 5 | 58 | 1857 | 96 | 93 |
| 6 | 35 | 4 | 61 | 1813 | 93 | 61 |
| 7 | 53 | 20 | 27 | 2022 | 92 | 64 |
| 8 | 49 | 18 | 33 | 1897 | 93 | 72 |
| 9 | 45 | 17 | 38 | 1712 | 94 | 72 |
| 10 | 42 | 16 | 42 | 1659 | 100 | 80 |
| 11 | 40 | 15 | 45 | 1522 | 100 | 84 |
| 12 | 37 | 14 | 49 | 1473 | 100 | 92 |
| 13 | 51 | 40 | 9 | 2031 | 92 | 53 |
| 14 | 44 | 34 | 22 | 1803 | 92 | 58 |
| 15 | 41 | 32 | 27 | 1652 | 93 | 60 |
| 16 | 38 | 30 | 32 | 1547 | 94 | 70 |
| 17 | 36 | 28 | 36 | 1448 | 100 | 82 |
| 18 | 32 | 25 | 43 | 1253 | 100 | 84 |
| 19 | 42 | 50 | 8 | 1626 | 92 | 61 |
| 20 | 39 | 48 | 13 | 1603 | 92 | 65 |
| 21 | 37 | 44 | 19 | 1501 | 92 | 68 |
| 22 | 35 | 42 | 23 | 1431 | 93 | 69 |
| 23 | 33 | 40 | 27 | 1325 | 92 | 70 |
| 24 | 30 | 36 | 34 | 1248 | 100 | 83 |
| 25 | 36 | 58 | 6 | 1522 | 92 | 58 |
| 26 | 34 | 54 | 12 | 1453 | 95 | 67 |
| 27 | 32 | 52 | 16 | 1362 | 96 | 72 |
| 28 | 29 | 47 | 24 | 1249 | 76 | 74 |
| 29 | 27 | 43 | 30 | 1149 | 94 | 82 |
| 30 | 25 | 41 | 34 | 1094 | 93 | 87 |
| 31 | 27 | 55 | 18 | 1191 | 92 | 78 |
| 32 | 26 | 53 | 21 | 1142 | 92 | 77 |

TABLE 2

| Comparative Example | Negative Electrode Active Material Components (%) | | | Discharge Capacity at 1st Cycle (mAh/g) | Discharge Capacity Retention (%) | |
|---|---|---|---|---|---|---|
| | Si | Sn | Zn | | at 50th Cycle | at 100th Cycle |
| 1 | 100 | 0 | 0 | 3232 | 47 | 22 |
| 2 | 56 | 44 | 0 | 1817 | 91 | 42 |
| 3 | 45 | 55 | 0 | 1492 | 91 | 42 |
| 4 | 38 | 62 | 0 | 1325 | 91 | 42 |
| 5 | 90 | 0 | 10 | 3218 | 82 | 36 |
| 6 | 77 | 0 | 23 | 2685 | 82 | 39 |
| 7 | 68 | 0 | 32 | 2398 | 82 | 39 |
| 8 | 60 | 0 | 40 | 2041 | 83 | 37 |
| 9 | 54 | 0 | 46 | 1784 | 83 | 32 |
| 10 | 49 | 0 | 51 | 1703 | 75 | 24 |
| 11 | 31 | 4 | 65 | 1603 | 91 | 40 |
| 12 | 64 | 24 | 12 | 2478 | 91 | 37 |
| 13 | 23 | 47 | 30 | 996 | 72 | 42 |
| 14 | 21 | 44 | 35 | 912 | 66 | 31 |

Figure 5:
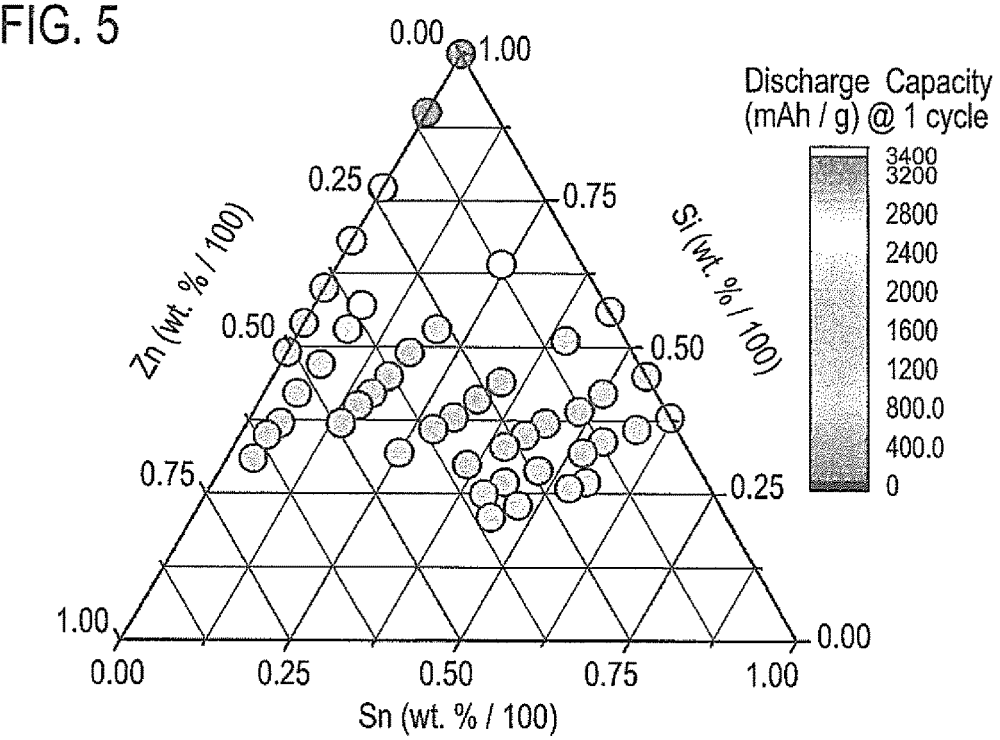
Figure 6:
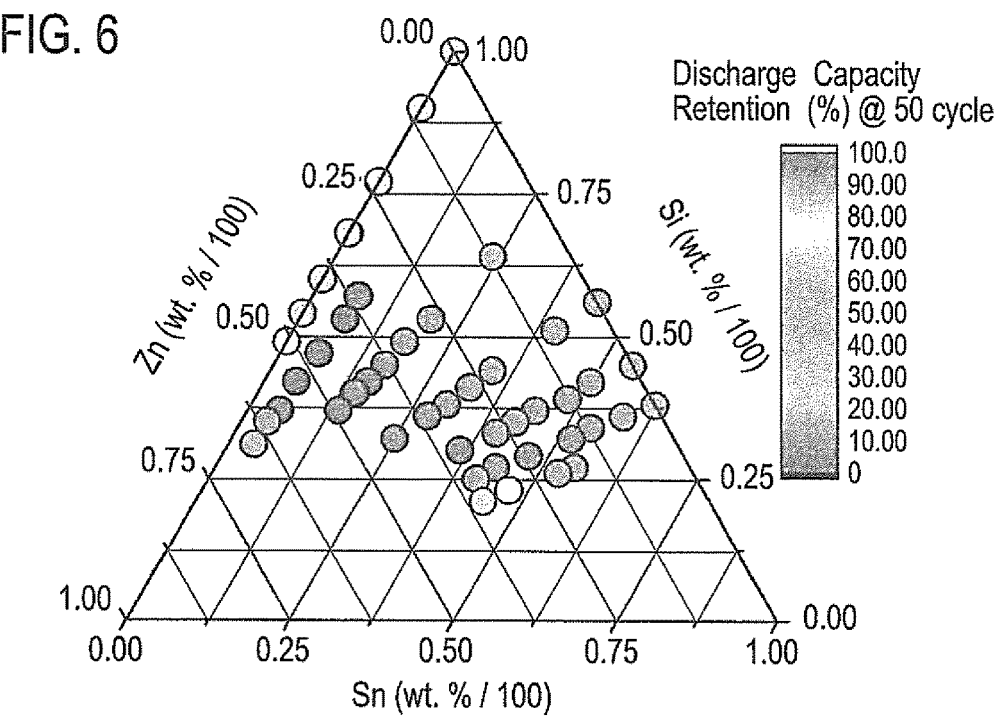
Figure 7:
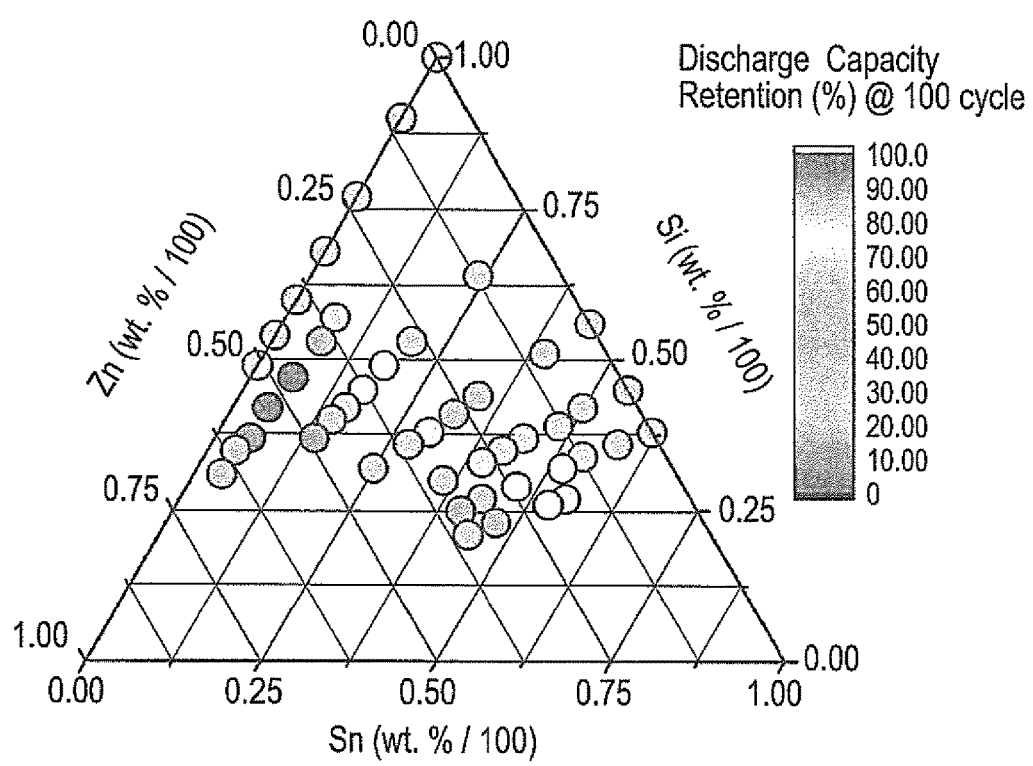

The test results revealed that the batteries of Examples using the negative electrode active materials including the Si—Sn—Zn series alloys containing the respective elements within the particular ranges, namely, in the area X shown in FIG. 1, each show the initial capacity exceeding at least 1000 mAh/g. as shown in FIG. 5. Further, as shown in FIG. 6 and FIG. 7, it was revealed that the negative electrode active materials including the Si—Sn—Zn series alloys in the area X shown in FIG. 1 each show the discharge capacity retention of 92% or greater after 50 cycles and show the discharge capacity retention exceeding 50% even after 100 cycles.

Although the present invention has been described above by reference to the examples, the present invention is not limited to the descriptions thereof, and it will be apparent to those skilled in the art that various modifications and improvements can be made.

The present invention employs the Si—Sn—Zn series ternary alloy as the negative electrode active material for an electric device. Accordingly, the electric device such as a lithium ion secondary battery including the negative electrode active material can improve the cycle life of the battery and ensure a high capacity and high cycle durability.

The invention claimed is:

1. A negative electrode active material for an electric device comprising an alloy consisting essentially of, in terms of mass ratio, a content of silicon is greater than 23% to less than 58%, a content of tin is greater than or equal to 4% to less than or equal to 7%, a content of zinc is greater than 38% to less than 61%, and inevitable impurities as a residue.

2. The negative electrode active material for an electric device according to claim 1, wherein a content of silicon is greater than 23% to less than 58%, a content of tin is greater than or equal to 5% to less than or equal to 6% and a content of zinc is greater than 38% to less than 61%.

3. The negative electrode active material for an electric device according to claim 1, wherein a content of silicon is greater than or equal to 37% to less than or equal to 53%, a content of tin is greater than or equal to 4% to less than or equal to 7% and a content of zinc is greater than 38% to less than 61%.

4. The negative electrode active material for an electric device according to claim 3, wherein a content of silicon is greater than or equal to 37% to less than or equal to 47%, a content of tin is greater than or equal to 5% to less than or equal to 6% and a content of zinc is greater than or equal to 47% to less than or equal to 58%.

5. A negative electrode for an electric device, comprising the negative electrode active material according to claim 1.

6. An electric device comprising the negative electrode for an electric device according to claim 5.

7. An electric device comprising the negative electrode active material for an electric device according to claim 1.

8. The electric device according to claim 7, wherein the electric device is a lithium ion secondary battery.

* * * * *